(12) United States Patent
Jeon et al.

(10) Patent No.: US 12,026,003 B2
(45) Date of Patent: Jul. 2, 2024

(54) OPERATION APPARATUS FOR VEHICLE

(71) Applicant: SEOYON E-HWA CO., LTD., Anyang (KR)

(72) Inventors: Jong Hwan Jeon, Anyang (KR); Ho Jae Lee, Cheonan (KR)

(73) Assignee: SEOYON E-HWA CO., LTD., Anyang (KR)

( * ) Notice: Subject to any disclaimer, the term of this patent is extended or adjusted under 35 U.S.C. 154(b) by 146 days.

(21) Appl. No.: 17/933,084

(22) Filed: Sep. 17, 2022

(65) Prior Publication Data

US 2023/0133929 A1 May 4, 2023

(30) Foreign Application Priority Data

Oct. 30, 2021 (KR) .......................... 10-2021-0147501

(51) Int. Cl.
*G05G 1/02* (2006.01)
*G05G 5/00* (2006.01)
*G05G 9/00* (2006.01)

(52) U.S. Cl.
CPC .............. *G05G 1/02* (2013.01); *G05G 5/005* (2013.01); *G05G 9/00* (2013.01); *G05G 2505/00* (2013.01)

(58) Field of Classification Search
CPC ............ G05G 1/02; G05G 5/005; G05G 9/00; G05G 2505/00; G05G 5/00; B60K 2360/126; B60K 2360/128; B60K 2360/682; B60K 2360/688; B60K 35/10; B60K 37/06; B60K 2370/128; B60K 35/00; G06F 3/016; H01H 13/14; H01H 13/20; H01H 13/26; H01H 13/023; H01H 13/85; H01H 2003/085; H01H 2217/00
See application file for complete search history.

(56) References Cited

U.S. PATENT DOCUMENTS

| | | | |
|---|---|---|---|
| 9,104,243 B2 | 8/2015 | Shin | |
| 11,914,413 B2* | 2/2024 | Jeon | .................. B60K 35/10 |
| 2022/0126766 A1* | 4/2022 | Jeon | .................. B60R 16/033 |
| 2023/0136074 A1* | 5/2023 | Jeon | .................. B60Q 3/82 |
| | | | 296/1.07 |

FOREIGN PATENT DOCUMENTS

| | | |
|---|---|---|
| JP | 2019-127139 A | 8/2019 |
| KR | 10-1550604 B1 | 9/2015 |
| KR | 10-2019-0036714 A | 4/2019 |
| KR | 10-2277316 B1 | 7/2021 |

* cited by examiner

*Primary Examiner* — Lheiren Mae A Caroc
(74) *Attorney, Agent, or Firm* — Harvest IP Law, LLP

(57) ABSTRACT

Proposed is an operation apparatus for a vehicle, the apparatus includes a panel with an opening, an operation module capable of moving, through the opening, between a first position and a second position spaced apart from each other in a front-back direction, a first rotary link and a second rotary link, each configured to be rotatably provided at a rear of the operation module and to be paired with each other, a drive source configured to provide a driving force for rotating the first rotary link and the second rotary link, and a cam mechanism configured to connect the first rotary link and the second rotary link to the operation module, to induce an angular motion in which the first rotary link and the second rotary link are rotated in opposite directions, and to move the operation module to the first position or the second position.

13 Claims, 9 Drawing Sheets

OPERATION APPARATUS FOR VEHICLE

CROSS REFERENCE TO RELATED APPLICATION

The present application claims priority to Korean Patent Application No. 10-2021-0147501, filed Oct. 30, 2021, the entire contents of which is incorporated herein for all purposes by this reference.

BACKGROUND OF THE INVENTION

Field of the Invention

The present disclosure relates to an operation apparatus having a button used by a user to operate devices included in a vehicle, primarily from an inside of the vehicle.

Description of the Related Art

In general, vehicles are equipped with an array of devices that improves comfort and convenience of a user (driver and/or passenger). These devices are controlled by buttons (switches) that the user directly manipulates.

The buttons may be provided in various forms in an interior of the vehicle. In recent years, as vehicles have come equipped with more functions, the number of buttons disposed in the interior of the vehicle is gradually increasing. This may give the user the impression that the buttons are too complicated to use, or may lead to errors in the operation of the buttons. In addition, a cluttered interior with too many buttons may degrade the aesthetic quality of the interior of the vehicle.

SUMMARY OF THE INVENTION

Accordingly, the present disclosure has been made keeping in mind the above described problems, and is intended to provide an operation apparatus for a vehicle that improves the visibility of a button and the aesthetic value of a vehicle by configuring the button to appear and disappear.

Another objective of the present disclosure is to provide an operation apparatus for a vehicle that is more advantageous in terms of improved appearing/disappearing mechanism for buttons, compactness, and reduction of manufacturing cost.

Still another objective of the present disclosure is to provide an operation apparatus for a vehicle that enables reduction of the number of buttons and simplification of the structure.

The objectives of the present disclosure are not limited to those mentioned above, and other objectives not mentioned will be clearly understood by those skilled in the art from the following description.

In order to achieve the above objective, according to an embodiment of the present disclosure, there is provided an operation apparatus for a vehicle, the operation apparatus including: a panel provided in the vehicle, and having an opening; an operation module capable of moving, through the opening, between a first position and a second position spaced apart from each other in a first direction and having a button disposed at a front end; a first rotary link and a second rotary link, each configured to be rotatably provided, at a rear of the operation module, on an axis extending in a second direction orthogonal to the first direction, and to be paired with each other; a drive source configured to provide a driving force for rotating the first rotary link and the second rotary link; and a cam mechanism configured to connect the first rotary link and the second rotary link to the operation module, to induce an angular motion in which the first rotary link and the second rotary link are rotated in opposite directions, and to move the operation module to the first position or the second position according to a direction of the angular motion.

The cam mechanism may include: a first cam pin provided on the first rotary link and a second cam pin provided on the second rotary link; and a first cam pin guide having a first guide path connected to the first cam pin, and a second cam pin guide having a second guide path connected to the second cam pin, wherein each of the first cam pin guide and the second cam pin guide is provided on the operation module.

Each of the first rotary link and the second rotary link may have a first end and a second end opposite the first end. The first end may be disposed on the axis and the second end may be disposed in a rearward position or a forward position located forward of the rearward position according to the direction of the angular motion. The first cam pin and the second cam pin may be provided at the second end of the first rotary link and at the second end of the second rotary link, respectively, along the second direction. The first guide path and the second guide path may extend in a straight line along a third direction orthogonal to a plane including the first direction and the second direction. The drive source may be a linear actuator including a moving body, wherein the moving body is movable in the third direction. Each of the first rotary link and the second rotary link may be configured such that the first end thereof is rotatably connected to the moving body about the axis.

The first rotary link and the second rotary link, which are connected to the operation module by the cam mechanism and paired with each other, may be provided in plurality, and may be uniformly disposed in a central region of the rear of the operation module.

The operation module may be switched to an inactive state in the first position and an active state in the second position. The operation module may be configured such that, in the first position, a surface of the button may be flush with a surface of the panel. The second position may be located forward of the first position, whereby the operation module may be configured such that the button may protrude from the surface of the panel in the second position. Alternatively, the second position may be located rearward of the first position, whereby the operation module may be configured such that the button may be recessed from the surface of the panel in the second position.

The operation apparatus for a vehicle according to an embodiment of the present disclosure may further include: a finish skin that provides a finished surface covering a surface of the panel to block the opening, has flexibility, and is configured such that a portion blocking the opening is moved together with the button so that a shape of the finished surface changes according to the moving of the operation module.

The operation apparatus for a vehicle according to an embodiment of the present disclosure may further include: a sensor that detects a user's action for manipulating the button; and a control unit that controls the drive source on the basis of a detection signal from the sensor. The operation module may move a first distance or a second distance from the first position according to the user's action, wherein the movement of the first distance may place the operation module in a rear region of the second position and the movement of the second distance may place the operation module in a front region of the second position.

The button may be operated to perform different functions depending on whether the operation module is located in the front region or the rear region.

The sensor may detect, on the basis of the user action, whether a user's body is located in a first range of distance or a second range of distance from the button.

The operation apparatus for a vehicle according to an embodiment of the present disclosure may be configured such that the operation module may move the first distance when the sensor detects that the user's body is located in the first range of distance, and the operation module may move the second distance when the sensor detects that the user's body is located in the second range of distance.

The operation module may include a light source. The light source may be controlled by the control unit to emit light of different colors depending on whether the operation module is located in the front region or the rear region.

The operation module may be configured to operate in a touch manner. For example, for the touch method, the operation module may be configured to use a change in capacitance as the user's body part, such as a hand, approaches the button. Alternatively, the operation module may be configured to operate in a push-based manner instead of the touch manner.

Technical solutions will become more specific and clear from the examples, drawings, etc. described below. In addition, various solutions other than the aforementioned ones may be additionally suggested below.

According to an embodiment of the present disclosure, depending on the position of an operation module, a button may be in a state easily seen by a user (for example, a state in which the operation module is located in the second position and the button protrudes from the surface of a panel) or in a state difficult to be seen by the user (for example, a state in which the operation module is located in the first position and the surface of the button is flush with the surface of the panel). Accordingly, it is possible to provide better visibility and improved design regarding the button.

In addition, according to an embodiment of the present disclosure, since a drive unit for moving the operation module includes rotary links (paired first and second rotary links), a single drive source (linear actuator), and a cam mechanism (first cam pin and first cam pin guide connected to each other, and second cam pin and second cam pin guide connected to each other), and the cam mechanism is configured to convert angular motion of the rotary links by the drive source into linear motion and transmit it to the operation module, the operation module can be moved quickly and precisely by a simple configuration and high torque.

Moreover, since the paired first rotary link and the second rotary link are rotated in opposite directions to spread apart the rotary links or bring the rotary links together during angular motion, it is possible to implement a constant speed movement of the operation module without vibration by reliably transmitting the driving force of the drive source to the operation module, and to stably and evenly support the operation module so that the operation module does not move. Additionally, in the process of moving the operation module, since the rotation center of the rotary links is moved and the position of the rotation center changes, the drive unit can be configured compactly as a whole by shortening the moving distance of the first cam pin and/or the second cam pin, and the like.

Furthermore, according to an embodiment of the present disclosure, since different functions are performed depending on the positions of the buttons, it is possible to reduce the number of buttons to be applied to the vehicle, thereby preventing the interior of a vehicle from being cluttered with many buttons.

The effects of the present disclosure are not limited to those mentioned above, and other effects not mentioned will be clearly understood by those skilled in the art from this specification and accompanying drawings.

BRIEF DESCRIPTION OF THE DRAWINGS

The above and other objectives, features, and advantages of the present disclosure will be more clearly understood from the following detailed description in conjunction with the accompanying drawings, in which.

DETAILED DESCRIPTION OF THE INVENTION

Hereinafter, embodiments of the present disclosure will be described with reference to the accompanying drawings.

According to an embodiment of the present disclosure, an operation apparatus for a vehicle, a vehicle including the same, etc. may be provided. The operation apparatus may be used to operate various devices included in a vehicle. For example, devices operated by the operation apparatus (hereinafter referred to as a device to be operated) may include a navigation device, an air conditioning device, a sound device, a lighting device, a door lock device, a door opening or closing device, a motor/engine starting device, a driving speed control device, etc. Therefore, the vehicle according to the embodiments of the present disclosure may include the operation apparatus and at least one or more devices to be operated by the operation apparatus. The operation apparatus and the device to be operated may be electrically connected to each other.

The operation apparatus is installed in a vehicle and includes a button manipulated by a user. The operation apparatus may be provided to constitute a part of a vehicle. The part to which the operation apparatus is applied may be primarily an interior part of a vehicle. For example, the interior part may be a door trim, a ceiling panel, a dashboard, a console, a seat, an armrest, and a central part of a steering wheel (hub), etc. Embodiments of the present disclosure will be mainly focused on application of the operation apparatus to an interior part of a vehicle.

First, an operation apparatus for a vehicle according to a first embodiment of the present disclosure will be described. The operation apparatus for a vehicle according to the first embodiment of the present disclosure is shown in FIGS. 1 to 7.

Figure 1:
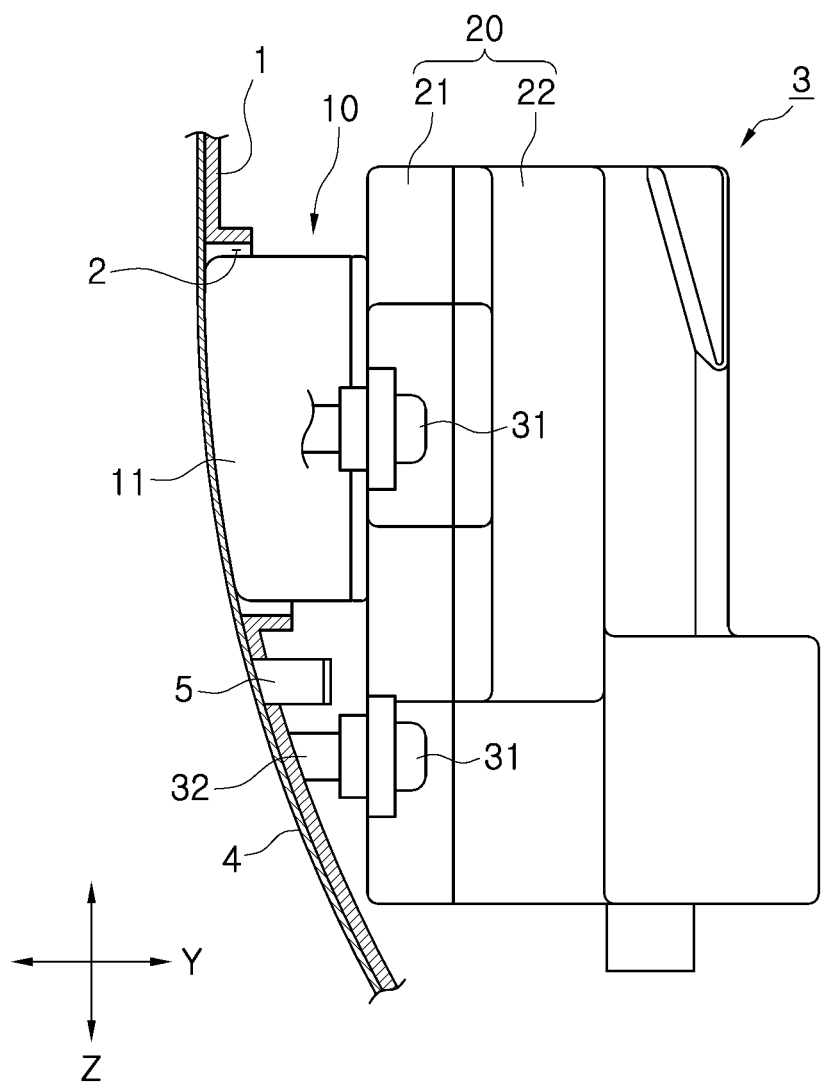
FIG. 1 is a side view illustrating an operation apparatus for a vehicle according to a first embodiment of the present disclosure.

Referring to FIG. 1, the operation apparatus includes: a panel 1 constituting an interior part of a vehicle; and at least one operation module assembly 3 provided on the panel 1.

The panel 1 has a panel surface and a panel back surface. The panel 1 may be configured such that the panel surface provides only a part of the surface of an interior part depending on the type, shape, etc. of the interior part, or that the panel surface provides the entire surface of the interior part. The panel 1 has an opening 2. The opening 2 is provided to penetrate the panel 1 through the panel surface and the panel back surface.

The operation module assembly 3 includes an operation module 10. The operation module 10 includes a button 11 manipulated by a user and is configured to operate, for example, in a touch manner. The button 11 is disposed at a front end of the operation module 10, and thus the operation module 10 has a front part including the front end composed of the button 11. The operation module 10 is moved in a front-back direction (refer to the Y-axis direction) which is a first direction with respect to the opening 2 of the panel 1. Here, the front-back direction is a direction composed of a front direction F (see FIG. 7) facing the interior of the vehicle from the panel surface and a back direction B (see FIG. 6) facing a direction opposite to the front direction.

The button 11 that moves together with the operation module 10 may appear and disappear through the opening 2. To make the button 11 appear and disappear, the button 11 may protrude in an embossed form with respect to the panel surface to reveal its position and/or shape (see FIG. 7). The button 11 may be recessed in an engraved form rather than the embossed form with respect to the panel surface in order to reveal its position and/or shape. The embossed protrusion and the engraved recession may be achieved by moving the operation module 10 in the front-back direction with respect to the opening 2. The number of openings 2 may be increased or decreased according to the number of operation module assemblies 3 provided.

The operation apparatus further includes a skin 4 covering the surface of the panel and the button 11 to provide a finished surface. The skin 4 may be sized to cover some or all of the panel surface including the opening 2 of the panel 1. The skin 4 has flexibility (or elasticity) so that when the button 11 is moved, a portion covering the button 11 (a portion blocking the opening 2) is deformed by the button 11. In other words, the shape of the finished surface may change. For example, the portion covering the button 11 may be protruded by the button 11 to form a generally flat shape of the finished surface (see FIG. 7). When the finished surface is restored to the generally flat shape, the shape of the button 11 is hidden. Therefore, it is possible to prevent the interior of the vehicle from being cluttered with the button 11 (see FIG. 6).

The skin 4 may be bonded to the panel surface. In addition, since the portion covering the button 11 (the portion that blocks the opening 2) is bonded to the surface of the button 11, the skin 4 may be moved together with the button 11 and precisely deformed. In particular, the bonding of the skin 4 to the surface of the button 11 may be required when the button 11 is capable of being recessed to be flush with the panel surface. The bonding of the skin 4 to the panel surface and/or the bonding of the skin 4 to the surface of the button 11 may be made firmly by an adhesive or the like.

Figure 3:
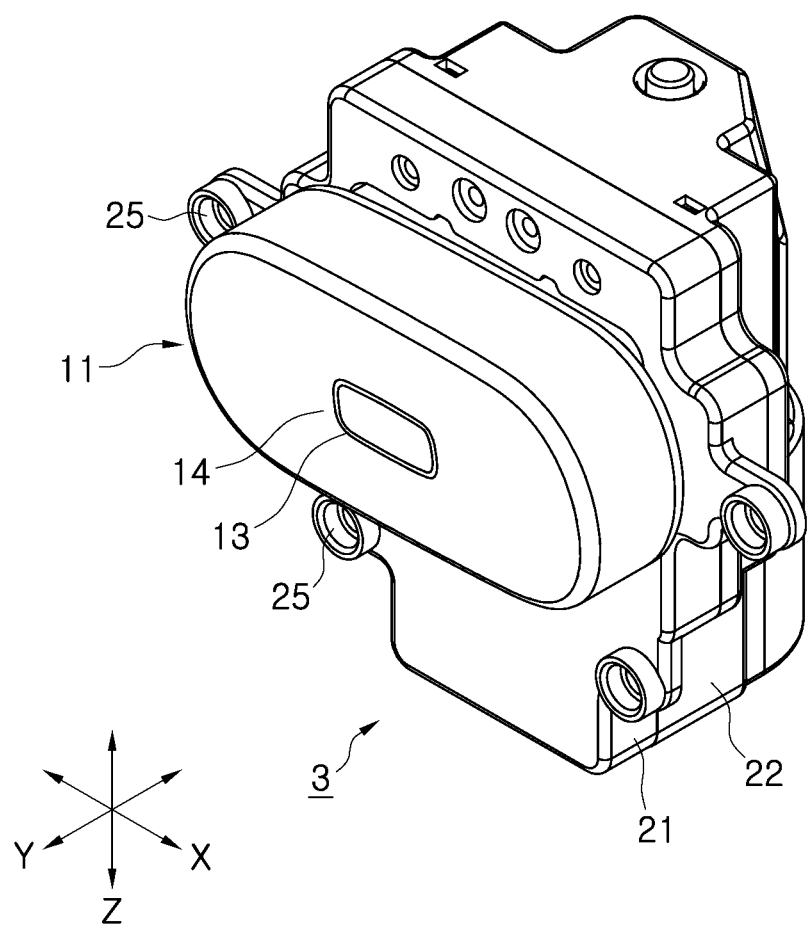
FIG. 3 is a perspective view illustrating an operation module assembly shown in FIG. 1.
Figure 4:
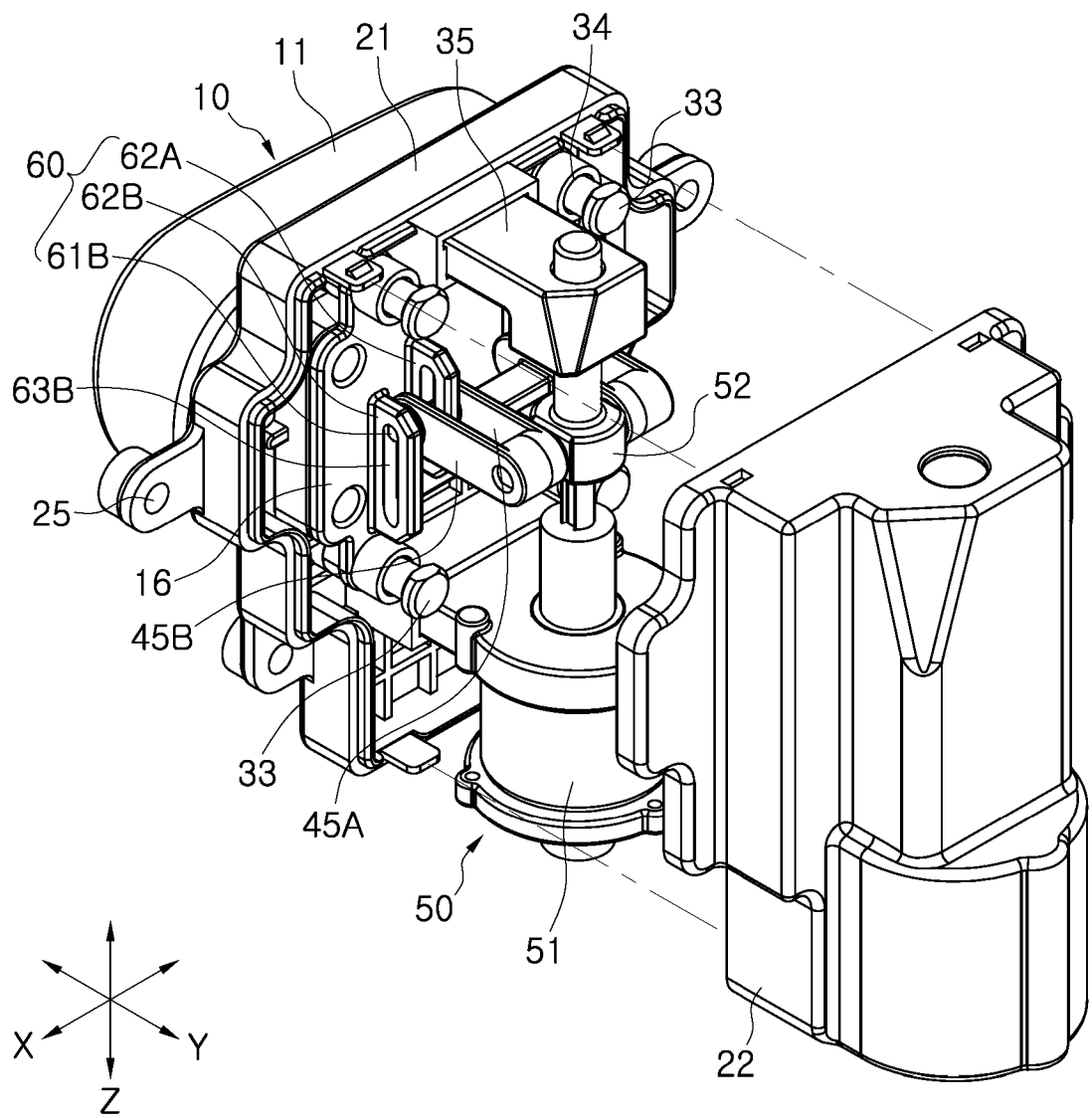
FIG. 4 is a perspective view from the back with a base cover separated in FIG. 3.
Figure 6:
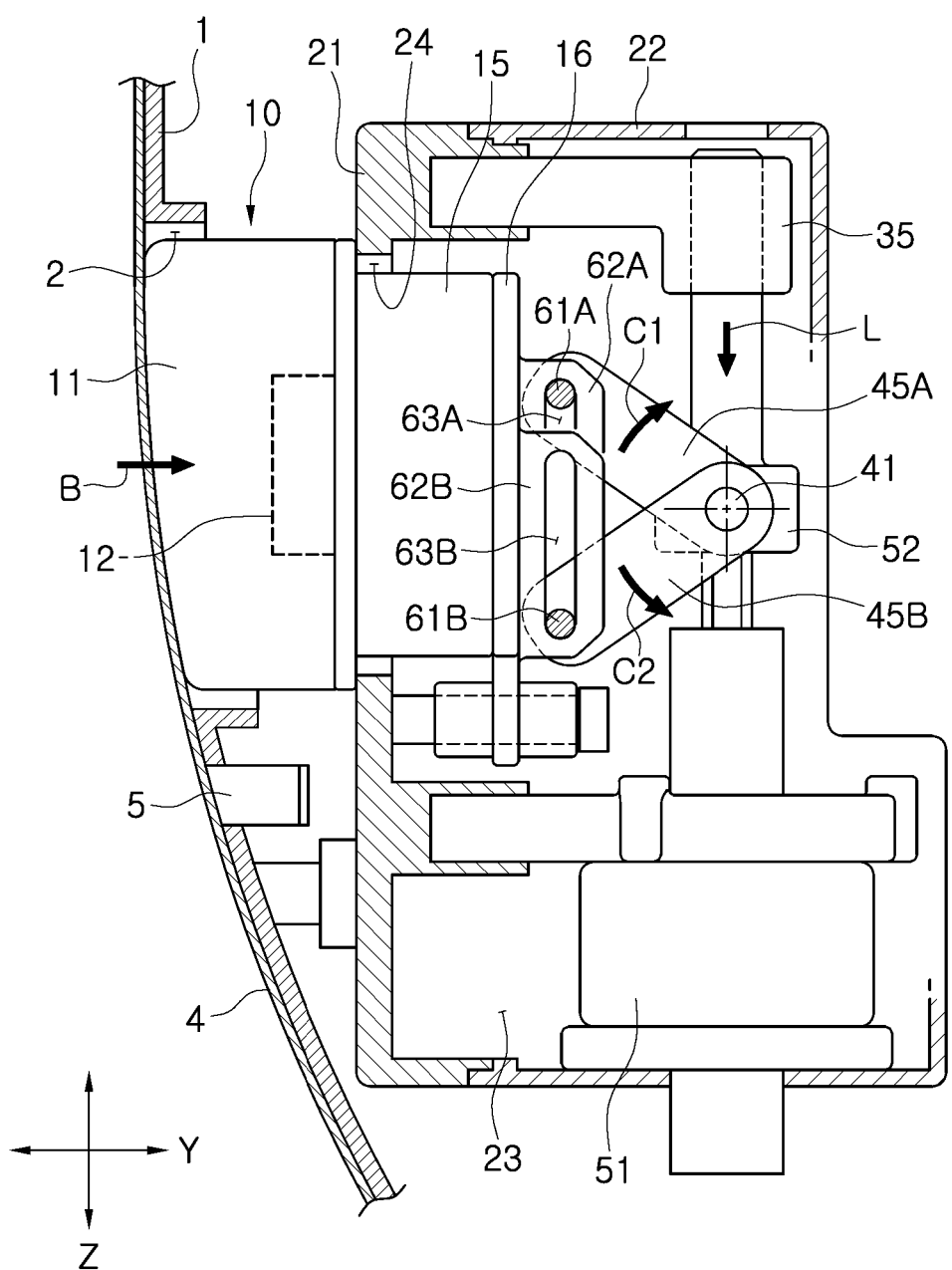
FIGS. 6 and 7 are side views illustrating motions of the operation apparatus for a vehicle according to the first embodiment of the present disclosure.
Figure 7:
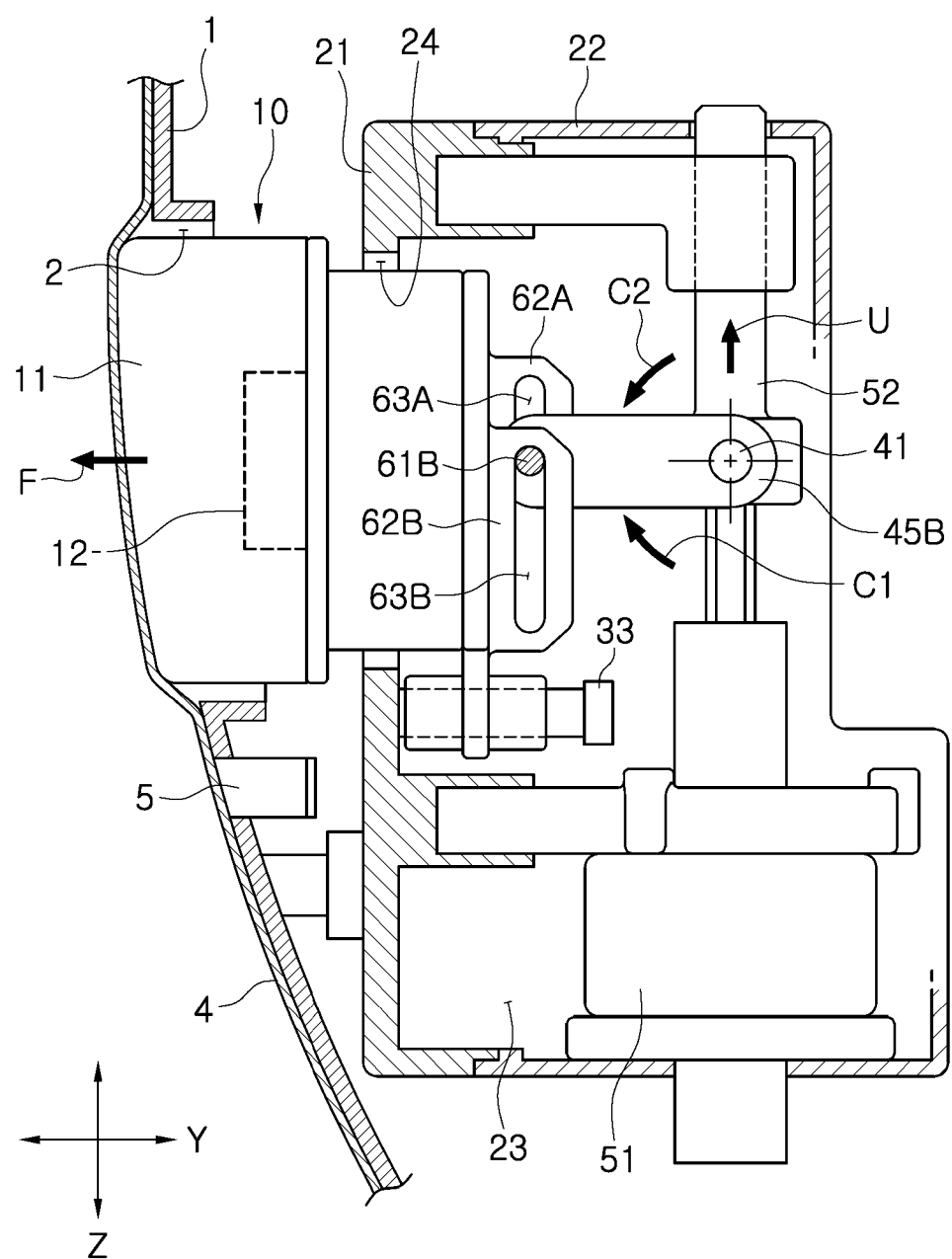

Referring to FIGS. 1, 3, and 4, the operation module assembly 3 further includes a base 21 disposed at a rear of the panel 1, and a base cover 22 detachably coupled to the base 21 at a rear of the base 21. The base 21 and the base cover 22 constitute a case 20. Referring to FIGS. 6 and 7, the case 20 is configured to provide an accommodating space 23 therein, which is partially or wholly blocked from the outside, and the base 21 has a through region 24 facing the opening 2. For example, the through region 24 may be provided in the form of a hole. As illustrated in FIGS. 1, 3, and 4, the base 21 may be mounted on the back side of the panel by means of fastening elements 31. The fastening elements 31 may be bolts, the base 21 may have an insertion hole 25 through which each bolt 31 passes, and the insertion holes 25 may be disposed around the through region 24. The bolts 31 passing through the insertion holes 25 may be coupled to female screw members 32 on the back surface of the panel, respectively.

The operation module 10 is provided to be moving between a first position and a second position spaced apart from each other in the front-back direction while being inserted into the through region 24 of the base 21. The first position is a position where the button 11 is accommodated in the opening 2, and the button 11 is formed such that the surface thereof is flush with the panel surface. The second position is located forward of the first position in the front direction F, and is a position where the button 11 protrudes from the panel surface. When the operation module 10 is located in the first position, the skin 4 may hide the button 11 by providing a finished surface in a generally flat shape (see FIG. 6). When the operation module 10 is moved to the second position, the button 11 protrudes from the panel surface and the skin 4 may be deformed into a shape in which a portion covering the button 11 protrudes by the button 11 to reveal the position of the button 11 (see FIG. 7). Depending on implementation, the second position may be a position in which the button 11 is recessed with respect to the panel surface while being located rearward of the first position in the back direction B. In this case, when the operation module 10 is moved to the second position, the skin 4 may be deformed into a shape in which a portion covering the button 11 is recessed to reveal the position of the button 11.

Figure 5:
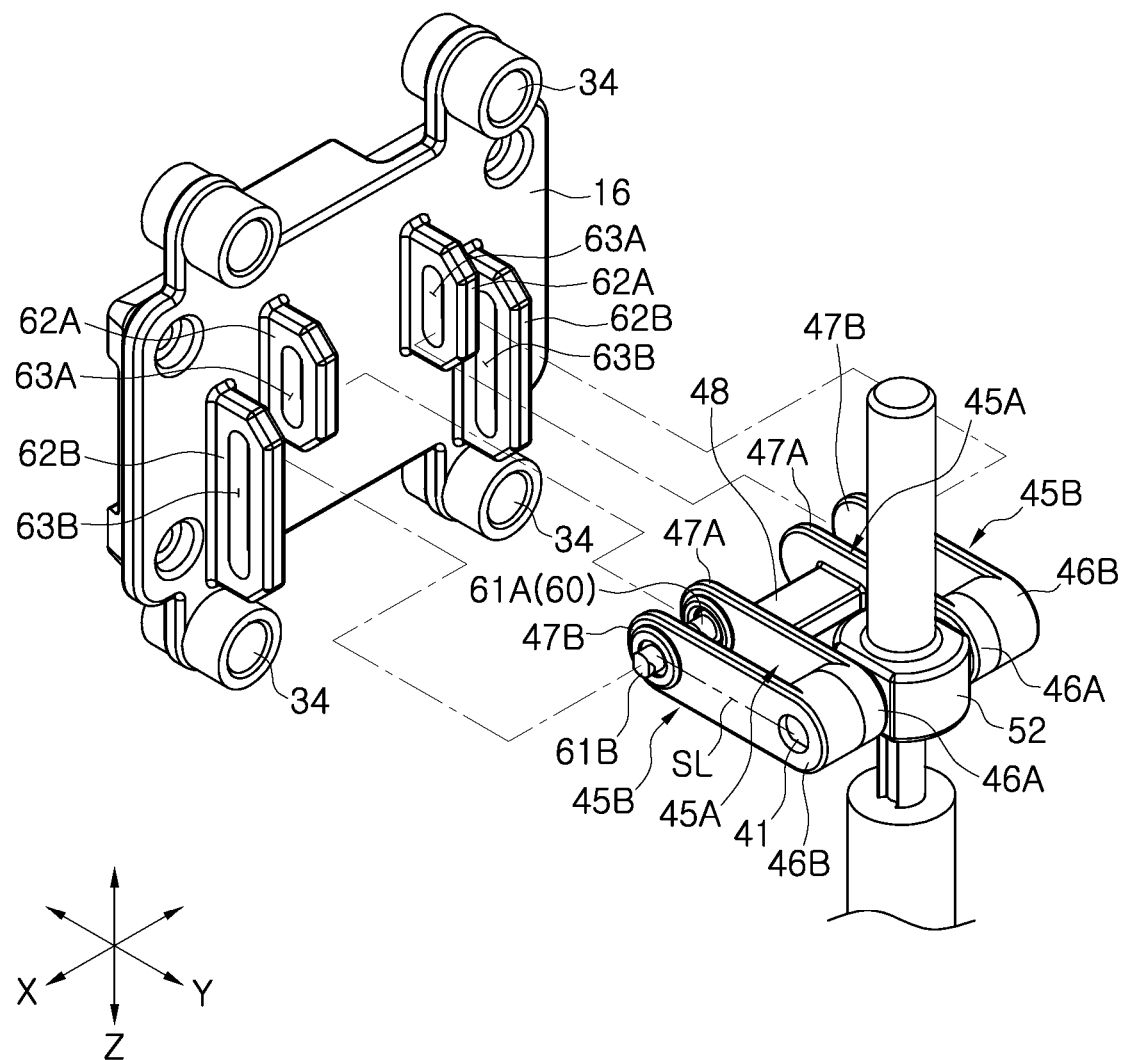
FIG. 5 is an exploded view illustrating a part of a drive unit shown in FIG. 4.

Referring to FIGS. 4 and 5, the operation module 10 may be precisely moved in the front-back direction with respect to the opening 2 by a module guide (Y-axis guide) having a plurality of guide pins 33 and guide holes 34. Each of the guide pins 33 is provided in the base 21, protrudes into the accommodating space 23 along the front-back direction, and is inserted into each of the guide holes 34. Guide holes 34 are provided in the operation module 10. Accordingly, the operation module 10 may be moved by the guidance of the guide pins 33. The guide pins 33 may be arranged around the through region 24 in the accommodating space 23. The guide holes 34 may be provided at the rear of the operation module 10. As illustrated in FIGS. 4 to 6, the operation module 10 may further include a module box 15 disposed at the rear of the button 11, the module box 15 has a cover member 16 constituting a rear portion including the rear end of the operation module 10, and the guide holes 34 may be disposed around the cover member 16.

The operation module assembly 3 may further include a drive unit (see 41, 45A, 45B, 50 and 60 in FIGS. 4 and 5) provided in the accommodating space 23. The drive unit may move the operation module 10 in the front-back direction with respect to the opening 2 to position the operation module 10 in the first position or the second position.

By the drive unit, the operation module 10 may be moved from the first position to the second position in the front direction F. When the operation module 10 is located in the second position, the button 11 protrudes from the panel surface, and the skin 4 is deformed into a shape in which a portion covering the button 11 protrudes (see FIG. 7). On the other hand, by the drive unit, the operation module 10 may be moved from the second position to the first position in the back direction B. When the operation module 10 is located in the first position, the button 11 has a surface flush with the panel surface, and the skin 4 is restored to provide the generally flat finished surface (see FIG. 6). Of course, if the second position is located rearward of the first position and is a position where the button 11 is recessed with respect to the panel surface, the skin 4 may be deformed into a shape in which a portion covering the button 11 is recessed.

Referring to FIGS. 4 and 5, the drive unit includes a drive source 50 and is configured to move the operation module 10 in the front-back direction by using a driving force of the drive source 50. To be specific, the drive unit includes: a shaft member 41 positioned rearward of the operation module 10 and extended along an axis orthogonal to the front-back direction, wherein the axis that the shaft member 41 is extended is referred to as a second direction; a first rotary link 45A and a second rotary link 45B, each rotatable about the shaft member 41 and paired with each other; a drive source 50 providing a driving force for rotating the first rotary link 45A and the second rotary link 45B; and a cam mechanism 60 that performs an angular motion in which the paired first rotary link 45A and the second rotary link 45B rotate in opposite directions within a preset angular range, converts the angular motion into a linear motion in the front-back direction, and transmits the linear motion to the operation module 10. In addition, the drive unit is configured such that the position of the shaft member 41, which is the rotation center of the first rotary link 45A and the second rotary link 45B, is moved when the first rotary link 45A and the second rotary link 45B connected to the operation module 10 are rotated in order to move the operation module 10 through the cam mechanism 60. The movement of the position of the shaft member 41 allows for a more compact configuration for the drive unit.

As noted above, the second direction is a direction orthogonal to the front-back direction. Accordingly, the second direction may be a left-right direction (refer to the X-axis direction), an up-down direction (refer to the Z-axis direction), etc. In this embodiment, the left-right direction is the second direction.

As illustrated in FIG. 5, the first rotary link 45A has a first end 46A and a second end 47A, and the second rotary link 45B has a first end 46B and a second end 47B. The first rotary link 45A and the second rotary link 45B may have a straight shape. The paired first rotary link 45A and the second rotary link 45B may be disposed adjacent and parallel to each other. The first rotary link 45A has the first end 46A and the second end 47A spaced apart and positioned on opposite ends of the first rotary link 45A, and the first end 46A is rotatably connected to the shaft member 41 to be rotated about the shaft member 41. The second rotary link 45B has the first end 46B and the second end 47B spaced apart and positioned on opposite ends of the second rotary link 45B, and the first end 46B is rotatably connected to the shaft member 41 to be rotated about the shaft member 41. The angular motion of the first rotary link 45A and the angular motion of the second rotary link 45B are performed in a state in which the first ends 46A and 46B are disposed rearward of the second ends 47A and 47B, respectively. By the cam mechanism 60, the paired first rotary link 45A and the second rotary link 45B rotate in opposite directions during the angular motion, so that they may spread the first rotary link 45A and the second rotary link 45B apart or bring the first rotary link 45A and the second rotary link 45B rotary links together. Thereby, the second end 47A of the first rotary link 45A and the second end 47B of the second rotary link 45B may be positioned in a rearward position or a forward position forward of the rearward position depending on a direction of the angular motion of the paired first rotary link 45A and the second rotary link 45B. The direction of the angular motion may be an angular motion in which the paired rotary links are rotated in opposite directions to spread the paired rotary links apart with respect to each other or an angular motion in which the paired rotary links are rotated in opposite directions to bring the paired rotary links together.

For the first rotary link 45A, when the second end 47A is positioned in the rearward position, a first imaginary straight line connecting the center of the first end 46A and the center of the second end 47A may form a 1A angle with respect to the front-back direction, while when the second end 47A is positioned in the forward position, the first imaginary straight line may form a 2A angle with respect to the front-back direction. For the second rotary link 45B, when the second end 47B is positioned in the rearward position, a second imaginary straight line SL connecting the center of the first end 46B and the center of the second end 47B may form a 1B angle with respect to the front-back direction, while when the second end 47B is positioned in the forward position, the second imaginary straight line SL may form a 2B angle with respect to the front-back direction. The 2A angle is smaller than the 1A angle and the 2B angle is smaller than the 1B angle. In this embodiment, the 2A angle and the 2B angle are defined as zero (0) degrees. FIG. 6 shows the state in which the paired first rotary link 45A and the second rotary link 45B are spread apart with respect to each other so that the second ends 47A and 47B are positioned in the rearward position, and FIG. 7 shows the state in which the paired first rotary link 45A and the second rotary link 45B are brought together so that the second ends 47A and 47B are positioned in the forward position.

Among the paired first rotary link 45A and the second rotary link 45B, the first rotary link 45A may be brought to the 2A angle state (the state in which the second end 47A is positioned in the forward position) by an angular motion in which the first rotary link 45A rotates in a counterclockwise direction C2 from the 1A angle state (the state in which the second end 47A is positioned in the rearward position), while the second rotary link 45B may be brought to the 2B angle state (the state in which the second end 47B is positioned in the forward position) by an angular motion in which the second rotary link 45B rotates in the a clockwise direction C1 from the 1B angle state (the state in which the second end 47B is positioned in the rearward position) (see FIG. 7). Of course, the first rotary link 45A may be brought to the 1A angle state by an angular motion in which the first rotary link 45A rotates in the clockwise direction C1 from the 2A angle state, and the second rotary link 45B may be brought to the 1B angle state by an angular motion in which the second rotary link 45B rotates in the counterclockwise direction C2 from the 2B angle state (see FIG. 6).

As illustrated in FIGS. 4 to 7, the drive source 50 is a linear actuator including a moving body 52 performing a linear motion, and the moving body 52 is provided to move along an up-down direction (refer to the Z-axis direction), which is also referred to as a third direction. The third direction is orthogonal to a plane including a first direction (front-back direction) and a second direction (left-right direction). The linear actuator 50 may be configured to move the moving body 52 in the up-down direction using a rotary motor 51.

The rotary motor 51 may have a position fixed to the base 21 or the base cover 22, and a male screw may be formed on the outer periphery of a motor shaft disposed in the up-down direction. The moving body 52 may be precisely moved in the up-down direction by a body guide 35 provided on the base 21 or the base cover 22. The moving body 52 may have a female screw corresponding to the male screw of the motor shaft of the rotary motor 51. The moving body 52 is screw-coupled with the motor shaft by means of the female screw and is restricted from being rotated together in the same direction as the motor shaft by the body guide 35 or the like, and thereby, may be moved in an upward direction U (see FIG. 7) or in a downward direction L (see FIG. 6) according to the rotation direction of the motor shaft.

Referring to FIGS. 6 and 7, the shaft member 41 is coupled to the moving body 52 of the linear actuator 50 to move in the up-down direction with the moving body 52. Of course, since the first ends 46A and 46B of the first and second rotary links 45A and 45B are rotatably coupled to the shaft member 41, the rotation center of the first and second rotary links 45A and 45B is also moved in the up-down direction with the moving body 52.

As illustrated in FIGS. 4 to 7, the cam mechanism 60 includes the first cam pin 61A and the second cam pin 61B and the first cam pin guide 62A and the second cam pin guide 62B for converting angular motion of the first and second rotary links 45A and 45B into linear motion in the front-back direction and transmits the linear motion to the operation module 10 in order to move the operation module 10 in the front direction F or the back direction B. The first cam pin guide 62A has a first guide path 63A, and the second cam pin guide 62B has a second guide path 63B. The first guide path 63A is connected to the first cam pin 61A, and the second guide path 63B is connected to the second cam pin 61B. The cam mechanism 60 is configured such that the first cam pin 61A is provided on the first rotary link 45A and the second cam pin 61B is provided on the second rotary link 45B, the first and second cam pin guides 62A and 62B are provided in the operation module 10, and the operation module 10 moves to the first position or the second position according to the direction of the angular motion of the first and second rotary links 45A and 45B.

The first cam pin 61A is provided along the left-right direction (refer to the X-axis direction) at the center of the second end 47A of the first rotary link 45A and protrudes from the second end 47A of the first rotary link 45A, while the second cam pin 61B is provided along the left-right direction at the center of the second end 47B of the second rotary link 45B and protrudes from the second end 47B of the second rotary link 45B. The first cam pin guide 62A is provided at the rear portion of the operation module 10 to face the first cam pin 61A, has the first guide path 63A at a portion facing the first cam pin 61A, and is disposed so that the first guide path 63A may be connected to the first cam pin 61A. The second cam pin guide 62B is provided at the rear portion of the operation module 10 to face the second cam pin 61B, has the second guide path 63B at a portion facing the second cam pin 61B, and is disposed so that the second guide path 63B may be connected to the second cam pin 61B. As shown in FIG. 5, the cam pin guides 62A and 62B may be attached to the cover member 16.

The first guide path 63A is provided to have a groove (cam groove) or hole (cam hole) structure into which the first cam pin 61A is inserted, and the second guide path 63B is provided to have a groove (cam groove) or hole (cam hole) structure into which the second cam pin 61B is inserted. The first and second guide paths 63A and 63B are formed to extend along the up-down direction (refer to the Z-axis direction), have a constant length, and have a constant width in the front-back direction (refer to the Y-axis direction). The first and second guide paths 63A and 63B may be a straight shape.

The first and second guide paths 63A and 63B move the operation module 10 to the first position by motions of the first and second cam pins 61A and 61B activated when the second ends 47A and 47B of the first and second rotary links 45A and 45B are moved from the forward position to the rearward position, (See FIG. 6), and move the operation module 10 to the second position when the second ends 47A and 47B of the first and second rotary links 45A and 45B are moved from the rearward position to the forward position (see FIG. 7).

The first and second cam pins 61A and 61B may be provided in a cylindrical shape so that the respective cross-section of the portion inserted into the first and second guide paths 63A and 63B may be formed in a circular shape, and the first and second guide paths 63A and 63B may be formed with a width corresponding to the diameter of the respective first and second cam pins 61A and 61B.

The first guide path 63A may be provided such that the upper end restricts further movement (upward rotation movement) of the first cam pin 61A beyond a first predetermined distance when the first rotary link 45A is rotated in the clockwise direction C1 in order to place the second end 47A of the first rotary link 45A at the rearward position, while the second guide path 63B may be provided such that the lower end restricts further movement (downward rotation movement) of the second cam pin 61B beyond a second predetermined distance when the second rotary link 45B is rotated in the counterclockwise direction C2 in order to place the second end 47B of the second rotary link 45B at the rearward position (see FIG. 6). The first guide path 63A may also be provided such that the lower end restricts further movement (downward rotation movement) of the first cam pin 61A beyond a third predetermined distance when the first rotary link 45A is rotated in the counterclockwise direction C2 in order to place the second end 47A of the first rotary link 45A at the forward position, while the second guide path 63B may be provided such that the upper end restricts further movement (upward rotation movement) of the second cam pin 61B beyond a fourth predetermined distance when the second rotary link 45B is rotated in the clockwise direction C1 in order to place the second end 47B of the second rotary link 45B at the forward position (see FIG. 7).

As described above, in the drive unit, when the second ends 47A and 47B of the first and second rotary links 45A and 45B are positioned in the rearward position so that the operation module 10 is positioned in the first position, the shaft member 41 and the moving body 52 are maintained in the state moved in the downward direction L, and as the first and second rotary links 45A and 45B are spread apart with respect to each other, the first cam pin 61A remains positioned at the upper end of the first guide path 63A and the second cam pin 61B remains positioned at the lower end of the second guide path 63B (see FIG. 6).

At this state, when the linear actuator 50 is operated to move the moving body 52 in the upward direction U, the shaft member 41 is moved together in the same direction. Accordingly, the paired first and second rotary links 45A and 45B rotate in opposite directions (the first rotary link 45A rotates in the counterclockwise direction C2, and the second rotary link 45B rotates in the clockwise direction C1) so as to be rotatably brought together about the shaft member 41. Next, the second ends 47A and 47B of the first and second rotary links 45A and 45B are moved from the rearward position to the forward position. As a consequence, the first rotary link 45A is in the 2A angular state (a state in which the second end 47A of the first rotary link 45A is positioned in the forward position) while the second rotary link 45B is in the 2B angular state (a state in which the second end 47B of the second rotary link 45B is positioned in the forward position), and the first cam pin 61A and the second cam pin 61B are moved together with the second end 47A of the first rotary link 45A and the second end 47B of the second rotary link 45B, respectively. Accordingly, the operation module 10 is moved from the first position in the front direction F to be positioned at the second position by the first cam pin 61A and the first guide path 63A connected to each other and the second cam pin 61B and the second guide path 63B connected to each other (see FIG. 7).

Conversely, by moving the moving body 52 in the downward direction L, the first rotary link 45A in the 2A angular state is rotated in the clockwise direction C1 to reach the 1A angular state (a state in which the second end 47A of the first rotary link 45A is positioned in the reverse position) and the second rotary link 45B in the 2B angular state is rotated in the counterclockwise direction C2 to reach the 1B angular state (a state in which the second end 47B of the second rotary link 45B is positioned in the reverse position). As a consequence, the operation module 10 at the second position is moved in the back direction B and is positioned at the first position by the first cam pin 61A and the first guide path 63A connected to each other and the second cam pin 61B and the second guide path 63B connected to each other (see FIG. 6).

As such, the drive unit (see 41, 45A, 45B, 50 and 60 of FIGS. 4 and 5) is operated such that the paired first and second rotary links 45A and 45B perform angular motion in which the paired first and second rotary links 45A and 45B rotate in opposite directions for brining rotary links 45A and 45B together when the operation module 10 is moved from the first position in the front direction F to be positioned at the second position. Accordingly, the driving force of the linear actuator 50 is reliably transmitted to the operation module 10 through the first and second rotary links 45A and 45B that are brought together, and the operation module 10 may be precisely moved at a constant speed.

Conversely, when the operation module 10 is moved from the second position in the back direction B to be positioned at the first position, the drive unit is operated such that the paired first and second rotary links 45A and 45B perform angular motion in which the paired first and second rotary links 45A and 45B rotate in opposite directions for spreading apart with respect to each other. Accordingly, as an example, even if an external force in the back direction B is applied to the operation module 10 located in the first position, the operation module 10 may be more stably supported by the first and second rotary links 45A and 45B spread apart with respect to each other and may be maintained in the first position.

In order to further enhance the effect of the angular motion in which the first rotary link 45A and the second rotary link 45B are rotated in a direction to be spread apart or brought together, the paired first and second rotary links 45A and 45B may be arranged to have a vertical symmetry in the central region of the rear of the operation module 10 so as to uniformly transmit the driving force of the linear actuator 50 to the operation module 10.

As described above, the drive unit is configured such that, the shaft member 41, which is the rotation center of the first and second rotary links 45A and 45B, is moved in the up-down direction and the position of the shaft member 41 is changed in the process of moving the operation module 10. Therefore, when compared with the configuration in which the first and second rotary links 45A and 45B are rotated about a shaft member 41 fixed to a position, the moving distance of at least one of the first cam pin 61A and the second cam pin 61B and the length of at least one of the first guide path 63A and the second guide path 63B may be shortened. Accordingly, the area required for the angular motion of the first and second rotary links 45A and 45B in the accommodating space 23 may be further reduced, and at least one of the first cam pin guide 62A and the second cam pin guide 62B may be provided in a smaller size, so that the overall size of the operation module 10 may be reduced.

Contrary to the description above, as illustrated in FIGS. 4 and 5, the paired first and second rotary links 45A and 45B may be provided in plurality, and be disposed at intervals so as to be spaced apart from each other in the left and right directions. As the paired first and second rotary links 45A and 45B are provided in plurality, the cam mechanism 60 may also be provided with a plurality of the first cam pin 61A and the first cam pin guide 62A, and a plurality of the second cam pin 61B and the second cam pin guide 62B. Here, the plurality of first rotary links 45A or the plurality of second rotary links 45B may be connected to each other by a connecting member 48 and rotated together, as shown in FIG. 5. Additionally, the plurality of pairs of the first rotary links 45A and the second rotary links 45B connected to the operation module 10 by the cam mechanism 60 may be uniformly disposed in the central region of the rear of the operation module 10 in order to further enhance the effect of the angular motion operation in which the plurality of pairs of the first rotary links 45A and the second rotary links 45B are rotated in a direction to be spread apart or brought together.

Figure 2:
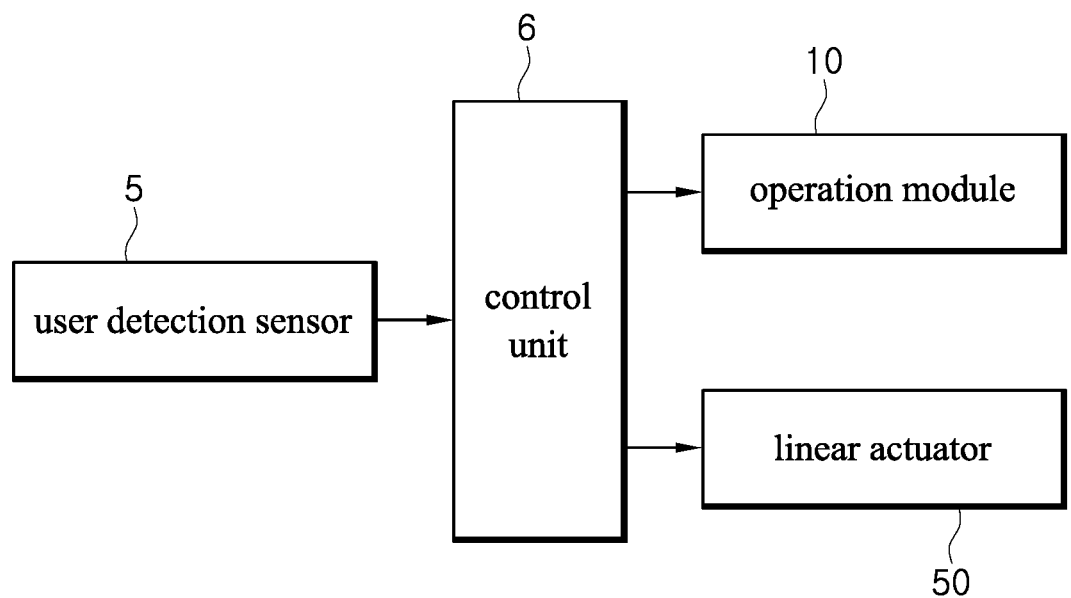
FIG. 2 is a block diagram illustrating main functional units of the operation apparatus for a vehicle according to embodiments of the present disclosure.

Referring to FIGS. 1 and 2, the operation apparatus further includes: a user detection sensor 5 for detecting a user's action for manipulating the button 11; and a control unit 6 for controlling the operation module 10 and the drive unit on the basis of a detection signal from the user detection sensor 5.

The user detection sensor 5 may be a proximity sensor that detects whether a user's body part, such as a hand, is in proximity to the button 11. To be specific, the user detection sensor 5 may be an optical proximity sensor, a magnetic proximity sensor, an ultrasonic proximity sensor, a high frequency oscillation proximity sensor, a capacitive proximity sensor, or the like. For reference, among these sensors, the optical proximity sensor may include a light emitting element and a light receiving element receiving light from the light emitting element. The light emitting element may be a light emitting diode, and the light receiving element may be a phototransistor. The user detection sensor 5 may be provided around the opening 2 in the panel surface (see FIG. 1).

When a detection signal is input from the user detection sensor 5 while the operation module 10 is located in the first position, a control unit 6 determines that the user attempts to manipulate the button 11, and moves the moving body 52 in the upward direction U by the control of the linear actuator 50 to move the operation module 10 from the first position to the second position (see FIG. 7). When the button 11 is not manipulated for a preset time after the operation module 10 is located in the second position, the control unit 6 determines that the user does not want to manipulate the button 11, and moves the moving body 52 in the downward direction L by the control of the linear actuator 50 to move the operation module 10 from the second position to the first position (see FIG. 6).

The operation module 10 is kept in an inactive state in the first position and is kept in an active state in the second position. To switch the state of the operation module 10, the control unit 6 may set the operation module 10 to an inactive state when the operation module 10 is in the first position, or to an active state when the operation module 10 is in the second position. Due to the configuration that allows switching between active and inactive states with respect to the operation module 10, the user may manipulate the button 11 to operate a device to be operated when the operation module 10 is located in the second position, and while the operation module 10 is waiting in the first position, it is possible to prevent the button 11 from being accidentally actuated by the user, thereby avoiding an unintentional operation of a device associated with the button 11.

Referring to FIGS. 6 and 7, the operation module 10 further includes a light source 12 for providing light. The light source 12 may be built in the button 11 to emit the light toward the surface of the button 11. The light source 12 may provide light of various colors. For example, the light source 12 may include at least one light emitting diode. As illustrated in FIG. 3, the button 11 is provided with a light-transmitting area 13 through which light from the light source 12 passes, and a light-blocking area 14 blocking the light from passing through on the surface thereof. The light-transmitting area 13 may be formed to have the shape of characters and/or figures indicating the function of the button 11.

In the operation module 10, the light source 12 is maintained in an off state in the first position, and the light source 12 is maintained in an on state in the second position. To change the state of the light source 12, the control unit 6 may turn off the light source 12 when the operation module 10 is located in the first position, and turn on the light source 12 when the operation module 10 is located in the second position. Due to the configuration that allows switching between off and on states with respect to the light source 12, when the operation module 10 is located in the second position, the active state of the operation module 10 and the position of the button 11 may be more accurately recognized by the user.

The skin 4 has a uniform light transmittance which allows light from the light source 12 pass through the skin 4, and the user's action for manipulating the button 11 can be detected by the user detection sensor 5 although the user detection sensor 5 is provided around the opening 2 in the panel surface. The skin 4 may be a sheet having the light transmittance woven with fibers having flexibility or elasticity.

Figure 8:
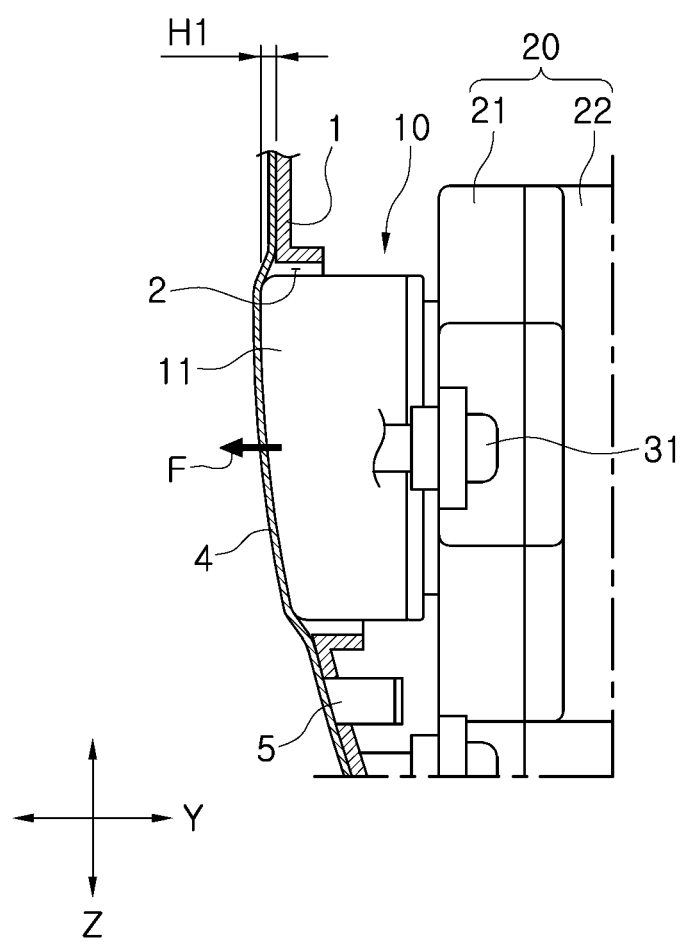
FIGS. 8 and 9 are side views illustrating motions of the operation apparatus for a vehicle according to a second embodiment of the present disclosure.
Figure 9:
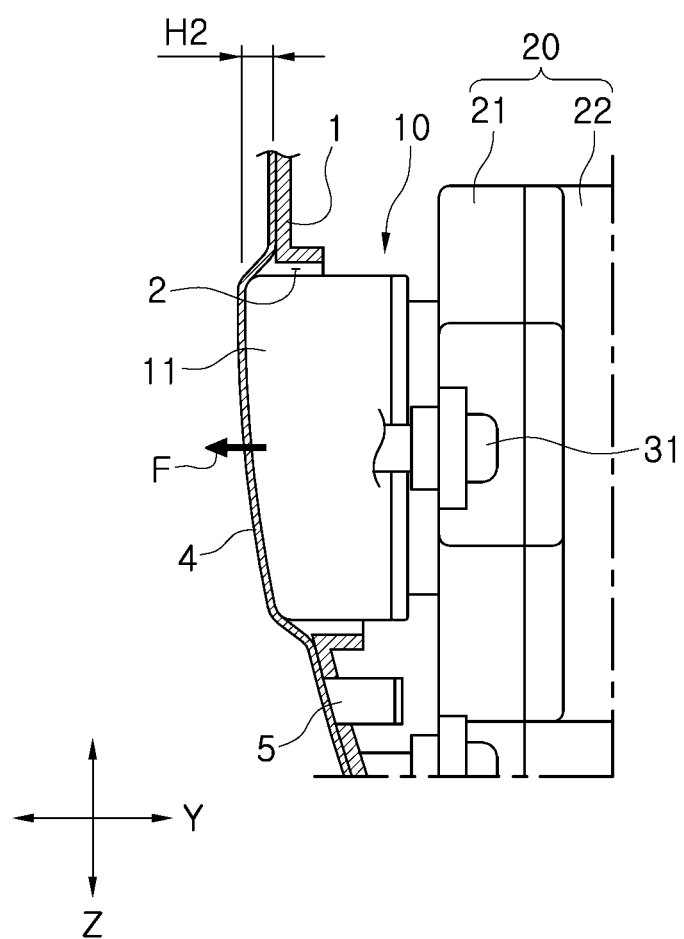

Hereinafter, an operation apparatus for a vehicle according to a second embodiment of the present disclosure will be described. The operation apparatus for a vehicle according to the second embodiment of the present disclosure is illustrated in FIGS. 8 and 9. The operation apparatus for a vehicle according to the second embodiment of the present disclosure is different from the operation apparatus for a vehicle according to the first embodiment of the present disclosure only in that the button is configured to perform a plurality of functions, and a related configuration thereof will now be explained in details.

Referring to FIGS. 8 and 9, the operation apparatus for a vehicle is configured such that the button 11 may protrude (or recessed) at different heights from the panel surface of the panel 1. That is, the second position may consist of a rear region and a front region, wherein the rear region is located relatively close to the panel surface and can be reached by moving the operation module 10 a first distance from the first position, and the front region is located relatively far from the panel surface and can be reached by moving the operation module 10 a second distance from the first position. Accordingly, the button 11 may protrude to a first height H1 when the operation module 10 is moved the first distance from the first position and is located in the rear region of the second position (see FIG. 8), and may protrude to a second height H2 when the operation module 10 is moved the second distance longer than the first distance and is located in the front region of the second position. (see FIG. 9). As another example, when the button 11 is configured to be recessed relative to the panel surface and the second position is located behind the first position, the button 11 may be recessed to different heights (depth).

The operation module 10 may be moved the first distance from the first position according to the detection signal of the user detection sensor 5 to be located in the rear region of the second position. In this case, the button 11 is projected to the first height H1 (see FIG. 8). The operation module 10 may be moved the second distance from the first position according to the detection signal of the user detection sensor 5 to be located in the front region of the second position. In this case, the button 11 is projected to the second height H2 (see FIG. 9). In addition, the button 11 may be operated to perform a first function and a second function when the operation module 10 is positioned in the rear region and the front region respectively. For example, when the device to be operated is a sound device, a volume increase may be performed as a first operation corresponding to the first function, and a volume decrease may be performed as a second operation corresponding to the second function. As another example, when the button 11 is manipulated while the operation module 10 is located in the rear region, a first device to be operated (e.g., a lighting device) may be operated as the first function, and when the button 11 is manipulated while the operation module 10 is located in the front region, a second device to be operated may be operated as the second function. With this configuration, since multiple functions may be performed with one button, the number of buttons required to be provided may be reduced, and further, the interior structure of the vehicle may be simplified.

To implement multiple functions with one button, the user detection sensor 5 may detect, on the basis of the user's action for manipulating the button 11, whether a user's hand or the like that is in the proximity of the button 11 is located in a first range of distance or in a second range of distance based on the button 11. For example, the region of the first range of distance may be a predetermined range of distance in which the user's hand or the like that is in the proximity of the button 11 is at a relatively close distance from the button 11, and the region of the second range of distance may be another predetermined range of distance in which the user's hand or the like that is in the proximity of the button 11 is at a relatively long distance from the button 11. As another example, the first range of distance and the second range of distance may be a left region (or an upper region) and a right region (or a lower region) with respect to the button 11 of the operation module 10 at the first position.

In this regard, when the user detection sensor 5 detects that the user's hand is positioned in the first range of distance while the operation module 10 is located in the first position, the control unit (see 6 in FIG. 2) may determine that the user is attempting to perform the first function and may move the operation module 10 to the rear region of the second position (see FIG. 4) by the control of the linear actuator (see 50 in FIG. 4). Of course, when the user detection sensor 5 detects that the user's hand is positioned in the second range of distance, the control unit may determine that the user is attempting to perform the second function and may move the operation module 10 to the front region of the second position by the control of the linear actuator (see FIG. 8).

Meanwhile, by the control unit (see 6 in FIG. 2), the light source (see 12 in FIGS. 6 and 7) may maintain a state of emitting different colors of light depending on whether the operation module 10 is located in the rear region or the front region of the second position. When the operation module 10 is located in the rear region, the light source may emit the light of a first color. When the operation module 10 is located in the front region, the light source may emit the light of a second color. With this configuration, the user may more accurately recognize if the operation module 10 is positioned in the front region or positioned in the rear region.

Although the present disclosure has been described above, the present disclosure is not limited by the disclosed embodiments and the accompanying drawings and may be variously modified by those skilled in the art without departing from the technical spirits of the present disclosure. In addition, the technical spirits described in the embodiments of the present disclosure may be implemented independently, or may be implemented in combination of two or more.

What is claimed is:

1. An operation apparatus for a vehicle, the operation apparatus comprising:
   a panel provided in the vehicle, and having an opening;
   an operation module capable of moving, through the opening, between a first position and a second position spaced apart from each other in a first direction and having a button disposed at a front end;
   a first rotary link and a second rotary link, each configured to be rotatably provided, at a rear of the operation module, on an axis extending in a second direction orthogonal to the first direction, and to be paired with each other;
   a drive source configured to provide a driving force for rotating the first rotary link and the second rotary link; and
   a cam mechanism configured to connect the first rotary link and the second rotary link to the operation module, to induce an angular motion in which the first rotary link and the second rotary link are rotated in opposite directions, and to move the operation module to the first position or the second position according to a direction of the angular motion.

2. The operation apparatus for a vehicle of claim 1, wherein the cam mechanism comprises:
   a first cam pin provided on the first rotary link and a second cam pin provided on the second rotary link; and
   a first cam pin guide having a first guide path connected to the first cam pin, and a second cam pin guide having a second guide path connected to the second cam pin, wherein each of the first cam pin guide and the second cam pin guide is provided on the operation module.

3. The operation apparatus for a vehicle of claim 2, wherein each of the first rotary link and the second rotary link has a first end and a second end opposite the first end, wherein the first end is disposed on the axis and the second end is disposed in a rearward position or a forward position located forward of the rearward position according to the direction of the angular motion,
   the first cam pin and the second cam pin are provided at the second end of the first rotary link and at the second end of the second rotary link, respectively, along the second direction, and
   the first guide path and the second guide path extend in a straight line along a third direction orthogonal to a plane including the first direction and the second direction.

4. The operation apparatus for a vehicle of claim 3, wherein the drive source is a linear actuator including a moving body, wherein the moving body is movable in the third direction, and
   each of the first rotary link and the second rotary link is configured such that the first end thereof is rotatably connected to the moving body about the axis.

5. The operation apparatus for a vehicle of claim 1, wherein the first rotary link and the second rotary link, which are connected to the operation module by the cam mechanism and paired with each other, are provided in plurality, and are uniformly disposed in a central region of the rear of the operation module.

6. The operation apparatus for a vehicle of claim 1, wherein the operation module is switched to an inactive state in the first position.

7. The operation apparatus for a vehicle of claim 1, wherein the operation module is configured such that, in the first position, a surface of the button is flush with a surface of the panel.

8. The operation apparatus for a vehicle of claim 7, wherein the second position is located forward of the first position, and
   the operation module is configured such that, in the second position, the button protrudes from the surface of the panel.

9. The operation apparatus for a vehicle of claim 1, further comprising:
   a finish skin that provides a finished surface covering a surface of the panel to block the opening, has flexibility, and is configured such that a portion blocking the opening is moved together with the button so that a shape of the finished surface changes according to the moving of the operation module.

10. The operation apparatus for a vehicle of claim 1, further comprising:
    a sensor that detects a user's action for manipulating the button; and
    a control unit that controls the drive source based on a detection signal from the sensor,
    wherein the operation module moves a first distance or a second distance from the first position according to the user's action, wherein the movement of the first distance places the operation module in a rear region of the second position and the movement of the second distance places the operation module in a front region of the second position, and
    the button is operated to perform a different function depending on whether the operation module is located in the front region or the rear region.

11. The operation apparatus for a vehicle of claim 10, wherein the sensor detects, based on the user action, whether a user's body is located in a first range of distance or a second range of distance from the button.

12. The operation apparatus for a vehicle of claim 11, wherein the operation module moves the first distance when the sensor detects that the user's body is located in the first range of distance, and the operation module moves the second distance when the sensor detects that the user's body is located in the second range of distance.

13. The operation apparatus for a vehicle of claim 10, wherein the operation module includes a light source,
    wherein the light source is controlled by the control unit to emit light of different colors depending on whether the operation module is located in the front region or the rear region.

\* \* \* \* \*